United States Patent Office 3,136,808
Patented June 9, 1964

3,136,808
TELOMERIZATION OF FLUORINATED HYDROCARBONS WITH ALKYLENE GLYCOL BORATES AND THE TELOMERIC PRODUCTS
Donald D. Emrick, Shaker Heights, Ohio, assignor to The Standard Oil Company, Cleveland, Ohio, a corporation of Ohio
No Drawing. Filed May 9, 1961, Ser. No. 108,756
17 Claims. (Cl. 260—462)

This invention relates to a process for the telomerization of fluorinated unsaturated hydrocarbons with alkylene glycol borates, and more particularly to the telomerization of fluorinated olefins, such as the fluoroethylenes, with borates of α- and β-alkylene glycols in the presence of a free radical initiator, and to the novel telomers thereby obtained.

Fluorinated olefins undergo a reaction known as telomerization, which involves the reaction of the olefin, called a taxogen, with a fragment of another molecule, known as a telogen, and the product of this reaction is called a telomer. The reaction can be defined by the following equation:

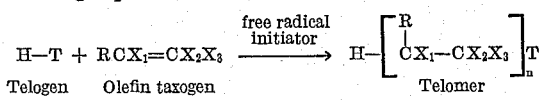

Telogen  Olefin taxogen   Telomer wherein X, $X_2$ and $X_3$ are halogen, R is fluorine or a perfluorinated alkyl radical, and $n$ is a whole number of one or greater. Telomers are different from copolymers and interpolymers. Copolymers and interpolymers contain a number of each of two or more different monomer units in the main polymer chain, whereas the fragments of another molecule (the telogen) in telomers appear as units at the terminal of the main polymer chain. The telomerization reaction proceeds in the presence of a free radical initiator which removes an active hydrogen atom from the telogen. The resulting radical initiates the telomerization by adding to the double bond of the olefin. However, the hydrogen atoms of alkylene glycols do not function readily in the reaction mechanism and the alkylene glycols telomerize only with difficulty and only give poor yields.

In the process of the invention, fluorinated α-olefin taxogens are telomerized with an alkylene glycol borate telogen in the presence of a free radical initiator for the telomerization. The ease with which the alkylene glycol borates telomerize is surprising, in view of the difficulty with which the corresponding alkylene glycols telomerize.

The product is a novel fluorinated telomer containing boron in the molecule in the form of an alkylene glycol borate end group.

The telogen is an alkylene glycol borate having a hydrogen atom, preferably tertiary, on at least one of the carbon atoms directly attached to oxygen, and can be defined by the following general formula:

(A)

wherein Y represents hydrogen or

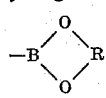

or

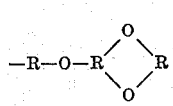

or $R_6$, and wherein R is an α- or β-alkylene radical, $R_6$ representing a monovalent hydrocarbon group such as an alkyl, aryl, mixed alkyl aryl, mixed aryl alkyl or cycloalkyl group having one to ten carbon atoms. The borate has a total of from about three and preferably from about four to about thirty carbon atoms.

It will be apparent from the foregoing that this formula can also be expressed in the following form:

(B)
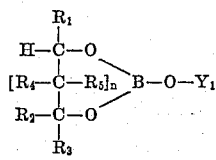

wherein $Y_1$ is H, or $R_6$ or

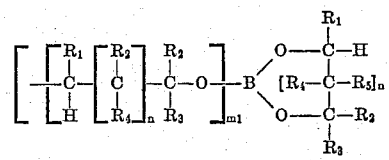

where $n$ is 0 or 1, and $m_1$ is 0 or 1.

Thus, the telogens are of two classes: the borates derived from α-alkylene glycols and the borates derived from β-alkylene glycols, and in each case the glycol can be combined with the boric acid residue in a ratio of 1:1, 2:2 or 3:2. The following specific groups of borates are within the class which can be used in accordance with the invention.

α-Alkylene glycol borates:

I (1)
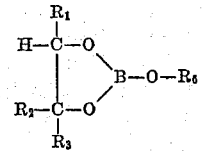
1:1:1

(2)
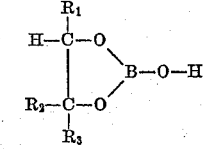
1:1

(3)
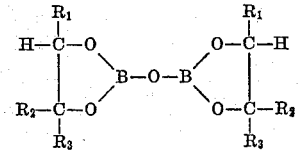
2:2

(4)
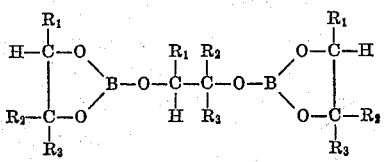
3:2

β-Alkylene glycol borates:

II (1)
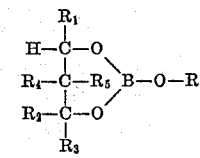
1:1:

(2) 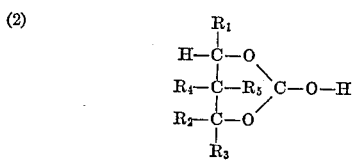

(3) 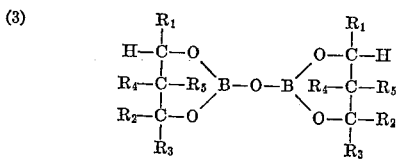

(4) 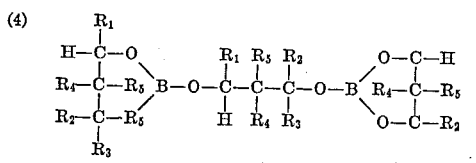

In the above formulae, $R_6$ is as in A above, and $R_1$, $R_2$, $R_3$, $R_4$ and $R_5$, which may be the same or different, represent hydrogen atoms or alkyl, aryl, mixed aryl alkyl, mixed alkyl aryl, or cycloalkyl groups each having from one to about ten carbon atoms, and preferably not having more than eight carbon atoms and being of a size and number such that the total number of carbon atoms in the alkylene glycol borate is from about three and preferably from about four to about thirty.

Since these borates can be formed from mixed glycols, $R_1$, $R_2$, $R_3$, $R_4$ and $R_5$ can differ in different parts of the molecule. The borate should be largely unpolymerized and compatible with hydrocarbons.

Typical $R_1$, $R_2$, $R_3$, $R_4$, $R_5$ and $R_6$ radicals are methyl, ethyl, n-propyl, isopropyl, n-butyl, isobutyl, secondary butyl, tertiary butyl, n-amyl, isoamyl, tertiary amyl, n-hexyl, isohexyl, 2-ethylhexyl, n-heptyl, tert-heptyl, n-octyl, iso-octyl, tert-octyl, n-nonyl, tert-nonyl, n-decyl, tert-decyl, phenyl, xylyl, benzyl, β-phenylethyl, α-phenylethyl, tolyl, ethylphenyl, dimethyl, cyclohexyl, methylcyclohexyl, cyclopentyl and cycloheptyl.

The following borates are examples of those which may be used in accordance with the invention:

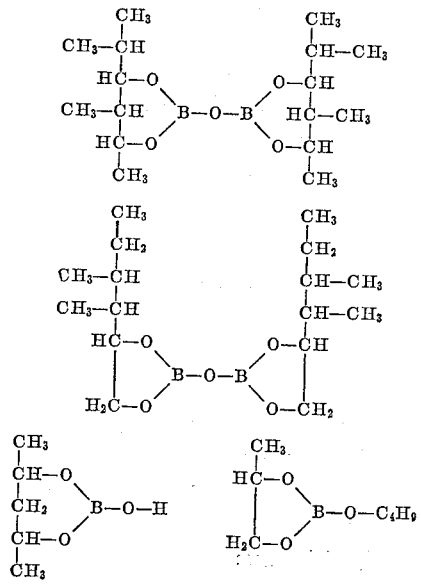

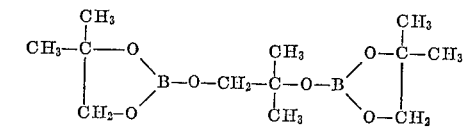

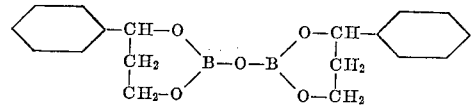

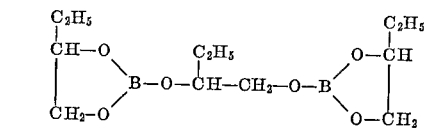

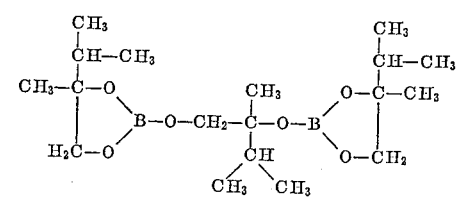

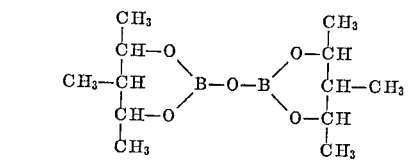

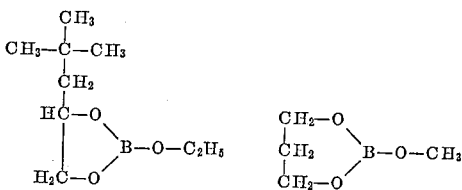

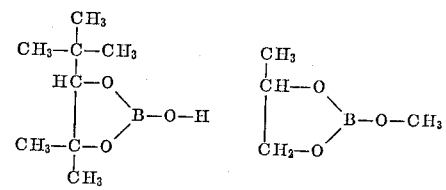

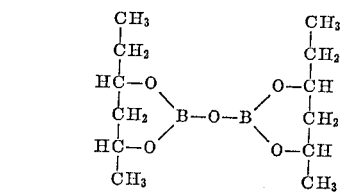

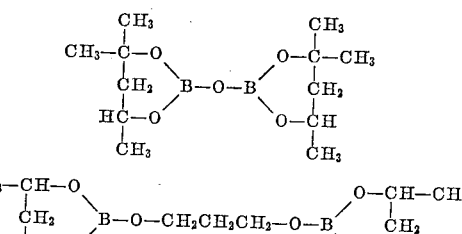

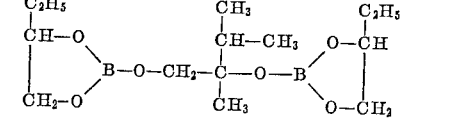

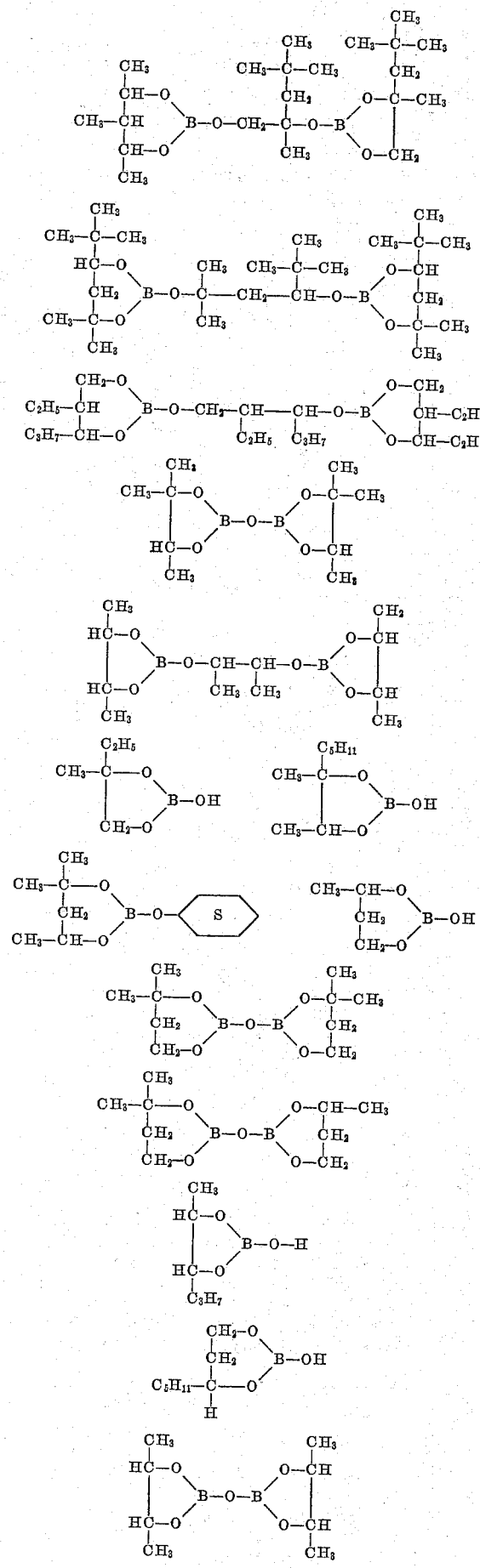

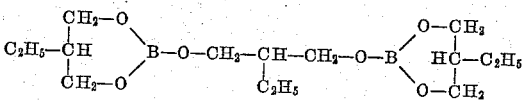

These alkylene glycol borates are believed to react with the fluorinated α-olefins according to the following equations:

$$\begin{matrix} R_1 \\ H-C---O \\ [R_4-C-R_5]_n \quad B-O-Y_1 + m_1 RCX_1-CX_2X_3 \longrightarrow \\ R_2-C---O \\ R_3 \end{matrix}$$

Telogen          Taxogen $$[H[CX_1R-CX_2X_3]_{m_1}]_{m_2}-Z$$

Boron-containing telomer

In the above formulae, R is fluorine or a perfluorinated radical having from one to about sixteen carbon atoms, and preferably not more than eight carbon atoms, $X_1$, $X_2$, and $X_3$ are halogen such as fluorine, chlorine, bromine, or iodine, $Y_1$ is as defined heretofore or as in Formula B, $m_1$ is the number of moles of compound or unit noted and $m_2$ is the number of chains attached to the terminal group

Z which is the α- or β-alkylene glycol borate residue, that is to say, the compound of Formula B less the number of hydrogen atoms ($m_2$) that have been replaced.

Preferably, $X_1$, $X_2$ and $X_3$ are fluorine but they can also be any other halogen or mixture of halogen. The trifluoro, chlorotrifluoro, tetrafluoro and perfluoro ethylenes and propylenes are especially advantageous, but the corresponding butenes, pentenes, hexenes, decenes, dodecenes, and tetradecenes are also quite satisfactory.

The taxogen is preferably a fluoroethylene or a mixture of fluoroethylene and one or more other fluorinated α-olefins containing a major proportion of a fluoroethylene. Fluorinated α-olefins higher than the fluoroethylenes in molecular weight can be used alone, but react more slowly and produce lower conversions and yields than fluoroethylenes. Mixtures of nonhalogen-containing α-olefins and the fluorinated olefins can also be used but the latter preferably is used in a major proportion, and advantageously in an amount of at least 90%.

The telomers obtained using fluoroethylenes alone, or fluoroethylene-rich mixtures, are higher in molecular weight and in melting point than the telomers composed partially or wholly of higher taxogens such as fluorinated propenes, butenes, pentenes, heptenes, octenes, decenes, styrenes, and 8-p-menthenes.

Typical fluorinated α-olefins include difluoroethylene, trifluoroethylene; chlorotrifluoroethylene; tetrafluoroethylene; 2,3-dichlorotetrafluoropropene; 3,3-dichlorotetrafluoropropene; 3-chloropentofluoro-1-propene; perfluoropropene; 1,1-dichloro-2,2-difluoroethylene; bromotrifluoroethylene; iodotrifluoroethylene; 1,2-dichloro-1,2-difluoroethylene; 1,2-dibromo-1,2-difluoroethylene; perfluorobutene-1; 1,2,3,4-tetrafluoropentene-1; perfluorohexene-1; perfluorodecene-1; perfluorostyrene; and 1,2-dichloro-1,2,3,4-tetrafluorobutene-1.

The reaction requires a free radical initiator. Furthermore, the telomerization reaction chain is easily interrupted and the reaction halted by conventional free radical inhibitors, and the reactants should be relatively free from such inhibitors.

Initiators which may be used include diacyl peroxides such as diacetyl peroxide, dipropionyl peroxide, dibutyryl peroxide, dilauroyl peroxide, acetyl benzoyl peroxide, and dibenzoyl peroxide; dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; diaryl peroxides or diaralkyl peroxides such as dicumyl peroxide, perhalogen compounds, such as hexachloroethane, and combinations thereof with dialkyl peroxides, organometallic compounds such as tetraethyl lead and tetraphenyl lead; and azo-N-N-compounds such as azobis (isobutyronitrile) and diazoaminobenzene.

Di-tert-butyl peroxide and α-dicumyl peroxide are preferred free radical initiators for use in the process of this invention. The stability of free radical initiators is customarily evaluated in terms of half-life at a stated temperature, and the following table compares this for several commercially available free radical initiators:

TABLE I

| Compound | Temp. (° C.) | Half life (hours) | No. of moles of radical produced per pound |
|---|---|---|---|
| 1. Tetraethyl lead | | | 5.62 |
| 2. Lauroyl peroxide | 50 | 54.2 | 2.27 |
| | 70 | 3.4 | |
| | 85 | 0.5 | |
| 3. Dicumyl peroxide | 115 | 12.4 | 3.34 |
| | 130 | 1.8 | |
| | 145 | 0.38 | |
| 4. Di-t-butyl peroxide | 100 | 218 | 6.20 |
| | 115 | 34 | |
| | 130 | 6.4 | |
| | 145 | 1.4 | |
| | 160 | 0.24 | |
| 5. Benzoyl peroxide | 70 | 13.0 | 3.74 |
| | 85 | 2.15 | |
| | 100 | 0.40 | |
| 6. 2,4-dichlorobenzoyl peroxide | 50 | 17.8 | 2.38 |
| | 70 | 1.41 | |
| | 85 | 0.25 | |
| 7. Azobis (isobutyronitrile) | 80 | 1.26 | 5.50 |

In general, the half-life of the free radical initiator employed should, at the reaction temperature, be within the range of from about 0.01 to about 10 hours, since such initiators have been found to give the best results. By suitable modification of the reaction conditions, however, it is possible to employ free radical initiators whose half-life is outside this range.

The reaction conditions can be widely varied. The preferred reaction temperature is established by the temperature at which the free radical initiator decomposes to give a rapid liberation of a substantial amount of free radicals and by the molecular weight of the product desired. For di-tertiary-butyl peroxide, for example, as the table shows, the preferred reaction temperatures are within the range of from 120 to 200° C. Lauroyl peroxide, on the other hand, can be used at temperatures of from 65 to 130° C. At reaction temperatures below this, the reaction time tends to be quite long because of the slower evolution of free radicals. Higher temperatures may be wasteful, since the free radical initiator may be decomposed at a higher rate than can be efficiently utilized in the telomerization. In general, for heat-decomposable free radical initiators, reaction temperatures within the range of from 40 to 200° C. are useful.

If the boiling point of the fluorinated unsaturated hydrocarbon is low, it is necessary to operate under pressure.

If the free radical initiator is decomposable by radiation, such as by ultraviolet rays, such radiation can be used, and it may then be unnecessary to heat the reaction mixture above room temperature. Azo-bis-(cyclohexane nitrile) and azo-bis-(isobutyronitrile) are initiators of this type, and in fact the latter initiator could be used to effect telomerization at temperatures below 0° C.

If the reactants are liquids at the reaction temperature, no solvent is necessary unless dilution is desired to maintain control of the reaction rate. However, a solvent for the fluorinated unsaturated hydrocarbons will assist in bringing it into contact with the telogen. A solvent may also be desirable when the telogen is a solid in order to increase the reaction rate by providing a more homogeneous reaction medium.

Any such solvent should be inert under the telomerization reaction conditions. Suitable solvents include benzene, cyclohexane, n-heptane, n-octane and iso-octane. Preferably, the reaction mixture is agitated.

The reaction is exothermic, and requires careful control to prevent the temperature from rising so high that free radical initiator decomposition becomes too rapid. The progress of a batchwise reaction can be followed by the drop in pressure.

The reaction time will depend upon the initiator and the reactants, the concentration thereof, and the reaction temperature. It is usually convenient to employ reaction conditions such that the reaction can be completed in a time as short as one hour. Reaction times as long as fifty hours, however, may not be out of line, depending upon the need.

A high olefin concentration will yield a higher molecular weight product than will a lower olefin concentration. A lower temperature has the same effect. At any given pressure level, the average molecular weight of the product may be increased by operating at the minimum temperature permitted by the decomposition temperature of the free radical initiator, so as to obtain a slow evolution of free radicals, but such a reaction will require a long time to complete.

The reaction is easily carried out in conventional pressure equipment. The reactants are introduced in any convenient order, and the equipment brought to the reaction conditions desired.

The ingredients may be brought together in any order but preferably the alkylene glycol borate, the fluorinated unsaturated hydrocarbon, and the solvent, if one is employed, are first mixed together and the free radical initiator is then added incrementally. If the fluoroolefin is a gas, such as chlorotrifluoroethylene, it may be in liquefied form prior to mixing or else added in gaseous form to a vessel held at a temperature below the liquefication temperature of the fluoroolefin. If desired, the reaction vessel may be run at a constant olefin gas pressure throughout the reaction during the addition of the free radical initiator; in this manner, greater telogen conversions may be obtained, together with the production of telomers of a more uniform average molecular weight distribution.

At the completion of the reaction, the reactor is cooled to room temperature, and vented to remove excess unreacted gaseous fluorinated olefins, after which the crude telomeric fluorinated glycol borate may be removed and recovered from unreacted contaminants. The crude reaction product, vented of excess unreacted fluorinated olefin, but containing the unreacted glycol borate, then is poured with stirring into approximately twenty times its weight of water. Most of the unreacted water-soluble glycol borate is extracted in the water phase. The extracted product is then further stirred for one-half hour with twenty times its weight of water to remove more of the water-soluble, unreacted glycol borate. Finally, the twice extracted product is mascerated twice with 2 to 5 times its weight of cold water. The resulting product is dried at an elevated temperature, such as 100° C., to remove entrained water and other volatile materials such as solvents. Alternatively, the product may be isolated by high vacuum fractionation, although this is not advisable if the telomer borate contains pyrolytically sensitive tertiary oxygen.

A continuous reaction is of particular interest in a commercial process. This is readily effected by suitable equipment which permits continuous blending of the alkylene glycol borate with the fluoroolefin and free radical initiator, holding them in a pressurized reaction chamber in which they have a dwell time equivalent to that required to complete the reaction, and then drawing them off to a working-up chamber where the solvent is removed and the residue recovered as stated above.

Boron-containing fluorotelomer products may be prepared having a wide range of molecular weights depending upon the reactants, reaction conditions and concentration of reactants. The boron content is important to the desirable and in many respects unique properties of these telomers. The higher the boron content, within the obtainable ranges, the more distinctive are the properties of the telomer. Usually, the boron content will be within the range from about 0.1 to about 5.5% by weight, and the molecular weight can range from as low as 200 to considerably beyond 3000, depending primarily on the reaction pressure of the fluorinated α-olefin taxogen. The boron content of the low molecular weight materials is higher than that of the higher molecular weight materials because the proportion of polyfluoroolefin is less. The low molecular weight materials, i.e., those having average cryoscopic molecular weights of from about 200 to about 700 are viscous oils or soft solids. The medium molecular weight materials having molecular weights of from about 700 to about 3000 and boron contents of from about 0.1 to about 1.6% are waxes, the hardness, flexibility and toughness of which increase with molecular weight.

The following examples are illustrative of the process and products of the invention.

Example 1

Into a nitrogen flushed 250-ml. capacity Magne-Dash autoclave were placed 44.3 g. of bis (2-methylpentane-2,4-diol) diborate, 39.6 g. of reagent grade benzene, and 2.5 g. of di-t-butyl peroxide. Approximately 50 ml. (80 g.) of liquefied chlorotrifluoroethylene was then added, and the mixture heated to and maintained at 133–143° C. with constant agitation. The reaction was allowed to continue for 4 hours, during which time the pressure decreased from 300 to 100 p.s.i. At the termination of the reaction, the unreacted fluorinated olefin was vented, and 137 g. of crude reaction product was obtained from which 40 g. of purified fluorinated telomer resulted. This product was a soft, water-insoluble solid having a cryoscopic average molecular weight of 752.

Example 2

Using the above apparatus and general procedure, 44.3 g. of bis (2-methylpentane-2,4-diol) diborate, 39.6 g. of reagent grade benzene, 2.5 g. of di-t-butyl peroxide, and approximately 30 ml. (48 g.) of liquefied chlorotrifluoroethylene were reacted at 136–142° C. for three hours. From 119 g. of the resulting crude product, 34 g. of a soft, semi-solid, fluorinated telomer was obtained which was water-insoluble and had a cryoscopic average molecular weight of 861.

Example 3

Using the same apparatus and general procedure, as Example 1, 44.3 g. of bis (2-methylpentane-2,4-diol) diborate, 36.6 g. of reagent grade benzene, 2.5 g. of di-t-butyl peroxide, and approximately 45 ml. (72 g.) of chlorotrifluoroethylene were reacted at 136–142° C. for four hours. A total of 146 g. of crude product was obtained from which 51 g. of a soft, semi-solid, fluorinated telomer was isolated which was completely water-insoluble and had a cryoscopic average molecular weight of 664.

Example 4

Using the same apparatus and general procedure as Example 1, 46.6 g. of bis(1,3-butanediol) biborate, 1.56 g. of di-t-butyl peroxide, and approximately 75 ml. (143 g.) of liquefied chlorotrifluoroethylene were reacted at 132–138° C. for 16 hours. A total of 139 g. of crude product was obtained from which 50 g. was isolated of water-insoluble fluorinated telomer which was a viscous semisolid having a cryoscopic average molecular weight of 842.

Example 5

Using the same apparatus and general procedure as Example 1, 56.6 g. of bis(1,3-butanediol) biborate, 44 g. of reagent grade benzene, 1.55 g. of di-t-butyl peroxide, and approximately 60 g. of chlorotrifluoroethylene were reacted at 118–138° C. for eight hours. From 129 g. of crude product, 28 g. of fluorinated telomer were isolated which was a pasty solid and completely water-insoluble.

Example 6

Using the same apparatus and general procedure as Example 1, 56.6 g. of bis(1,3-butanediol) biborate, 1.56 g. of di-t-butyl peroxide, and approximately 54 g. of perfluoropropene were reacted at 133–146° C. for three hours. From 104 g. of crude product, 20 g. water-insoluble, non-volatile fluorinated telomer was obtained, having a cryoscopic average molecular weight of 835.

Example 7

This example and the following Example 8 are illustrative of a continuous telomerization, using bis (1,3-butanediol) diborate and chlorotrifluoroethylene and tetrafluoroethylene.

The bis-diborate, pure benzene and di-tert-butyl peroxide were put in the mixing tank of the system which also included, in sequence from the mixer, an autoclave and a distilling or fractionating tower. The mixture was brought to a temperature of 132° to 138° C. This mixture was then fed into the autoclave reaction vessel, and blended with chlorotrifluoroethylene to a pressure of 300 p.s.i.g. This vessel had a capacity of 1 liter. The reactant mixture was fed into the autoclave incrementally, and a corresponding proportion of reaction mixture interdrawn, at such a rate that the average dwell time was 16 hours, and over a period of 160 hours, a total of 849 grams of the diborate, 1430 grams of benzene and 41 grams of di-tert-butyl peroxide had passed through the reactor. From this proportion of starting materials, 1390 grams of crude product were obtained. From this there was fractionated 500 grams of a water-insoluble fluorotelomer having a molecular weight of 850. This product was a viscous semisolid.

Example 8

A continuous telomerization was carried out employing a reaction mixture in the proportion of 566 grams of bis(1,3-butanediol) diborate, 550 grams of tetrafluoroethylene, 440 grams of pure benzene and 15.5 grams of di-tert-butyl peroxide. This amount of reactants was fed through a 1 liter autoclave reactor vessel over a period of 80 hours, as in Example 7, such that the average dwell time of the reaction mixture in the autoclave was 8 hours. The reaction temperature was kept at 118° to 138° C., and the tetrafluoroethylene pressure at 300 p.s.i. The reaction product was withdrawn incrementally, and the reactant mixture added in corresponding increments. 1290 grams of crude product was obtained from this amount of starting materials, and this when fractionated yielded 280 grams of a water-insoluble fluorotelomer. This material had the consistency of a soft solid.

The reactivity of the borate units imparts very useful chemical properties, and a variety of derivatives may be formed.

Reaction with dilute alkaline reagents such as warm aqueous sodium or potassium hydroxide within the range of from 10° C. to 120° C. removes the boron from the cyclic borate units, producing hydroxyl groups, with the result that unusual long chain fluorinated α- and β-glycols can be obtained via the telomerization reaction. Because of the greater reactivity of the alkylene glycol borates in telomerization, and the ease of hydrolysis of the borate, this is a better route to these glycols than is the direct telomerization of the glycol.

These glycols are themselves susceptible of many reactions, because of the presence of the hydroxyl groups.

They may, for example, be reacted with isocyanates or polyisocyanates, such as toluene-2,4-diisocyanate, to produce urethane or polyurethane resins of much higher melting point.

The following example illustrates this reaction:

Example 9

The telomer of Example 4, having a molecular weight of 842, was refluxed with a 10% sodium hydroxide solution for one hour. The boron-free glycol resulting therefrom was an oil which was reacted after thoroughly dry with an equimolar amount of toluene-2,4-diisocyanate. This was accomplished by heating the glycol to a temperature of 100° C. and stirring into it 20% by weight of anhydrous pyridine as a reaction medium and promoter. The toluene-2,4-diisocyanate was gradually poured into the mixture with stirring over a period of 10 minutes. The mixture was maintained, while stirring, at a temperature of 100° C. for one hour, and the temperature was then gradually increased over a period of one-half hour to 150° C., during which time the pyridine was removed by vaporization and the reaction product became a pasty mass. At this stage, the pasty mass was packed into a mold, and the mold was then heated for a period of one-half hour to increase the temperature gradually to 170° C. The final product was a solid, infusible resin.

Removal of the hydroxyl groups of the telomers of the invention by dehydration will produce long chain, probably conjugated, dienes.

The glycols will also transesterify with organic carboxylate esters under basic catalysis to produce glycol esters. Under acidic conditions only those fluorinated telomer glycols having primary or secondary hydroxyl groups produce esters—forming esters with these primary and secondary functions—since tertiary hydroxyls are very readily dehydrated to an olefinic linkage. Such esterification produces high temperature synthetic lubricants which are considerably more resistant to pyrolysis than comparable hydrocarbon lubricants, due to the presence of fluorine atoms.

Both acrylate and methacrylate esters may be prepared which can be polymerized or copolymerized with many available vinyl monomers to provide new polymeric or plastic materials. These latter materials are especially useful as chemically inert finishes and elastomeric coatings, having greater heat stability than most commercially available acrylate coatings. When the primary hydroxyls of the telomeric derived fluorinated glycols are reacted with phosphoric acid, phosphorus oxychloride, or phosphorus pentoxide the reaction products can be hydrolyzed to the mono-, di-, or triphosphate ester (depending upon the ratio of reactants). A similar reaction with sulfuric acid or chlorosulfonic acid forms the sulfate esters. Salts of both the hydrogen phosphate and hydrogen sulfate esters, formed by neutralizing the reaction products, are very useful surface active agents.

The borate group of the fluorotelomers having two tertiary oxygens $\alpha$ or $\beta$ to one another can also be decomposed with the elimination of boron at temperatures in excess of 300° F. to form long chain, probably conjugated, dienes which can then be dimerized or polymerized and cross-linked.

The boron-containing fluorotelomers of the invention, as the general formula shows, possess a polyhalocarbon portion and a terminal alkylene glycol borate portion. As a result, they have most attractive properties, both chemical and physical.

The fluorinated polyhalocarbon portion of the telomer, according to its molecular weight and the nature of the olefin used, controls the melting properties of the telomers, which vary from a liquid through a soft solid wax. The alkylene borate unit modifies the polymer considerably, as compared with fluoroolefin polymers such as polytetrafluoroethylene or polychlorotrifluoroethylene.

Polytetrafluoroethylene and polychlorotrifluoroethylene are solids, insoluble in organic solvents, inert to chemical attack, and do not flow at temperatures below 200° C. By comparison, the products of this invention are liquids, soft solids, or solids which melt below 200° C. The liquids are completely miscible with common organic solvents such as aromatic or halogenated hydrocarbons. The solid products are also very soluble in such organic solvents, although they are not always miscible in all concentration ranges.

The new telomeric fluorinated glycol borates possess the unique ability to bond or laminate metals or metal films to certain commercially available plastics containing fluorine, such as Teflon (polytetrafluroethylene) and Kel-F (polychlorotrifluoroethylene).

The liquid and oily telomers are useful as lubricants for textiles, machinery and internal combustion and jet engines, as lubricant and fuel additives to supply boron, and as hydraulic fluids. They adhere to glass. The soft waxy solid telomers are useful as waxes in the formulation of polishes, carbon paper, crayons, printing inks, coating compositions, hot melts, rubber compounding, and wire cable and pipe covering, either alone or compounded with other mutually compatible waxes and resinous materials.

This application is a continuation-in-part of application Serial No. 821,111, filed June 18, 1959, now abandoned.

I claim:

1. A fluoro $\alpha$-olefin telomer containing in the molecule an alkylene glycol borate end unit having from about three to about thirty carbon atoms, and fluorine.

2. A fluoro $\alpha$-olefin telomer containing in the molecule an $\alpha$-alkylene glycol borate end unit having from about three to about thirty carbon atoms, and fluorine.

3. A fluoro $\alpha$-olefin telomer containing in the molecule a $\beta$-alkylene glycol borate end unit having from about three to about thirty carbon atoms, and fluorine.

4. A fluoro $\alpha$-olefin telomer containing in the molecule a butylene glycol borate end unit, and fluorine.

5. A fluoro $\alpha$-olefin telomer containing in the molecule a hexylene glycol borate end unit, and fluorine.

6. A fluoroethylene telomer containing in the molecule an alkylene glycol borate end unit having from about three to about thirty carbon atoms.

7. A cotelomer of a fluoro $\alpha$-olefin and at least one additional olefin containing in the molecule an alkylene glycol borate end unit having from about three to about thirty carbon atoms, and fluorine.

8. A fluoro $\alpha$-olefin telomer containing in the molecule an alkylene glycol borate end unit having from about three to about thirty carbon atoms and fluorine, and having a boron content of from about 0.1 to about 1.6% by weight.

9. A process for producing boron containing fluoro $\alpha$-olefin telomers, which comprises telomerizing a fluoro $\alpha$-olefin taxogen having from about two to about twelve carbon atoms in the molecule with an alkylene glycol borate having from about three to about thirty carbon atoms in the molecule in the presence of a free radical initiator capable of initiating the telomerization at a temperature at which an evolution of free radicals from the initiator is obtained.

10. A process in accordance with claim 9 in which the temperature is within the range from 40 to 200° C.

11. A process in accordance with claim 9 in which the fluorinated $\alpha$-olefin is chlorotrifluoroethylene.

12. A process in accordance with claim 9 in which the fluorinated $\alpha$-olefin is tetrafluoroethylene.

13. A process in accordance with claim 9 in which the fluorinated $\alpha$-olefin is perfluoropropene.

14. A process in accordance with claim 9 in which the $\alpha$-olefin is a mixture of a fluorinated ethylene and a second $\alpha$-olefin, the fluorinated ethylene being present in a major proportion.

15. A process in accordance with claim 9 in which the free radical initiator is a dialkyl peroxide.

16. A process in accordance with claim 9 in which the telogen is an α-alkylene glycol borate.

17. A process in accordance with claim 9 in which the telogen is a β-alkylene glycol borate.

References Cited in the file of this patent

UNITED STATES PATENTS

| | | |
|---|---|---|
| 2,423,497 | Harmon | July 8, 1947 |
| 2,951,871 | Schroeder | Sept. 6, 1960 |

UNITED STATES PATENT OFFICE
CERTIFICATE OF CORRECTION

Patent No. 3,136,808                                June 9, 1964

Donald D. Emrick

It is hereby certified that error appears in the above numbered patent requiring correction and that the said Letters Patent should read as corrected below.

Column 2, line 72, for "1:1:" read -- 1:1:1 --; column 3, lines 1 to 5, formula (2) for that portion reading:

lines 15 to 20, formula (4) for that portion reading:

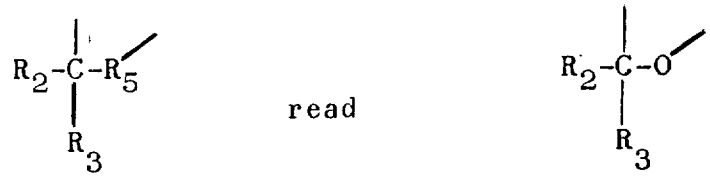

column 4, lines 65 to 70, for that portion of the formula reading:

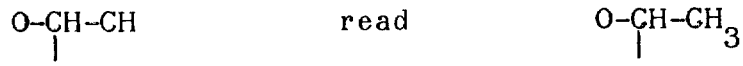

column 5, lines 18 to 21, for that portion of the formula reading:

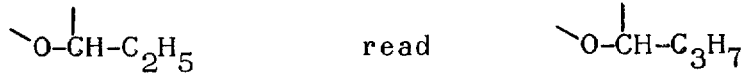

column 9, line 68, for "46.6 g." read -- 84.9 g. --; same line 68, for "1.56 g." read -- 4.1 g. --.

Signed and sealed this 19th day of January 1965.

(SEAL)
Attest:

ERNEST W. SWIDER                          EDWARD J. BRENNER
Attesting Officer                       Commissioner of Patents